March 24, 1970 B. COOPERMAN 3,502,992
UNIVERSAL ANALOG STORAGE DEVICE
Filed Sept. 1, 1965 4 Sheets-Sheet 1

INVENTOR.
BERNARD COOPERMAN
BY [signature]

UNIVERSAL ANALOG STORAGE DEVICE

Filed Sept. 1, 1965 4 Sheets-Sheet 2

INVENTOR.
BERNARD COOPERMAN
BY

UNIVERSAL ANALOG STORAGE DEVICE

Filed Sept. 1, 1965

INVENTOR.
BERNARD COOPERMAN
BY
[signature]

UNIVERSAL ANALOG STORAGE DEVICE

Filed Sept. 1, 1965

INVENTOR.
BERNARD COOPERMAN

BY [signature]

United States Patent Office 3,502,992

Patented Mar. 24, 1970

3,502,992

UNIVERSAL ANALOG STORAGE DEVICE

Bernard Cooperman, Syosset, N.Y., assignor to Sperry Rand Corporation, Ford Instrument Company Division, Long Island City, N.Y., a corporation of Delaware Filed Sept. 1, 1965, Ser. No. 484,297
Int. Cl. H03k *17/56*
U.S. Cl. 328—151 7 Claims

ABSTRACT OF THE DISCLOSURE

An electrical circuit especially useful in performing prescribed functions of maintaining the magnitude of an output signal continually equal to the magnitude of a recurring input signal, of performing signal multiplication and division, and of performing analog-to-digital conversion.

An amplifier is provided between the input and output circuits of the device, with means being also provided to vary the amplifier gain until the input and output signals are equal in magnitude. The gain control signal so developed is stored in an electronic device until the input signal next occurs, at which time it will cause the amplifier to produce an exact replica of the input signal.

This invention relates to an analog signal storage device and more particularly is directed to an analog memory cell which is capable of sampling an unknown analog signal, and subsequently reproducing such signal without the benefit of the original signal.

Prior art methods of storing analog signals which typically may be AC quantities generally involve the conversion of the AC quantity to DC wherein it is readily stored on a capacitor (or in a magnetic device such as a transfluxor) and the subsequent modulation of a prescribed carrier by this stored DC quantity. The modulation of the carrier then provides an indication of the originally stored AC signal. Other methods of storing analog signals require mechanical devices as in positioned potentiometers, stepping switches, etc.

In contradistinction to the prior art, the instant invention provides a novel universal memory cell for storing analog signals which is all electronic and requires no mechanical parts. The instant invention is based on an application of electronic feed-back and consequently is inherently capable of high accuracy since feed-back allows wide variations in many of the component parts of the system without corresponding degradation in its overall characteristics. In contrast with the peak sampling circuits of prior art analog storage devices, the instant invention requires no filters and consequently its operation is not limited to selected frequencies, or, for that matter, is not dependent on an accurately controlled external parameter such as a constant frequency. Furthermore, with the instant invention it is not necessary to activate the system at some precise time as is required by the peak sampling circuits of the prior art, and, in this respect it is noted that operation of the instant invention is not critically dependent on the signal waveform to be stored.

The universal analog memory cell of this invention is of a fundamental nature and consequently finds direct use in many applications such as: accurate storage of analog signals (AC or DC) in analog and hybrid computing systems; all electronic analog computation such as precision multiplication and division; multiplexer functions in digital-to-analog conversion systems; analog-digital conversion; sample and hold functions; modulators and demodulators; and automatic gain control. All of these functions may be achieved without modification of the basic universal memory cell and with only the addition of switching and/or multiple memory cells. The modular or building block characteristics of the universal analog memory cell will be described in greater detail throughout the remainder of the specification.

In essence, the universal memory cell of the instant invention operates by automatically adjusting the gain of a variable gain amplifier until its output (which corresponds to a fractional portion of a given reference signal) equals the input signal which is to be stored. The final value of the gain is then retained by virtue of a storage device; and this final value of the gain, when subsequently applied to the amplifier, will cause the amplifier to produce an exact replica of the input signal.

As noted above, a plurality of basic universal memory cells of the instant invention may be used to store a plurality of input signals. As will be shown in greater detail, if a single digital-to-analog converter is used to provide $n$ sequential analog outputs, then each of these $n$ analog outputs may be stored individually in one memory cell unit of the instant invention.

Alternatively, the basic single memory cell may be provided with additional switching, and as will be further shown, the resultant circuitry will perform the basic multiplication and division functions necessary in analog computation.

Finally, and as will be shown in greater detail, the basic memory cell can be used as a ratio type analog-to-digital converter.

From the wide variety of functions described above, it should be apparent to those skilled in the art, that the basic memory cell of the instant invention may find use in any application which requires the storage of analog signals.

Accordingly, it is an object of this invention to provide a storage device for sampling analog signals and subsequently reproducing these signals without the benefit of the original signal.

It is another object of the instant invention to provide a device for storing analog signals which comprises an amplifier for producing a variable output signal proportional to a given reference signal; a comparator for comparing the output signal of the amplifier with the input signal to be stored, the difference therebetween impressing a control signal which varies the output signal of the amplifier until it equals the input signal to be stored, and a storage device for storing the final value of the control signal so that subsequent activation of the amplifier will provide an output signal exactly equal to the input signal which was previously stored.

It is another object of the instant invention to provide a device for storing analog signals which is inherently capable of high accuracy.

Still another object of the instant invention is to provide a device for storing analog signals which is all electronic and thus requires no mechanical parts.

Another object of the instant invention is to provide a basic modular analog storage device which may be easily built upon to accomplish useful analog operations.

Yet another object of the instant invention is to provide a device for storing analog signals which may be easily extended to store a plurality of analog input signals.

It is still another object of the instant invention to provide a device for storing analog signals which may be easily extended to perform analog computation such as multiplication and division.

Yet another object of the instant invention is to provide a device for storing analog signals which may be easily extended to provide an analog-to-digital converter.

Other objects and a fuller understanding of the invention may be had by referring to the following description and claims, taken in conjunciton with the accompanying drawings, in which:

ANALOG STORAGE

Figure 1:
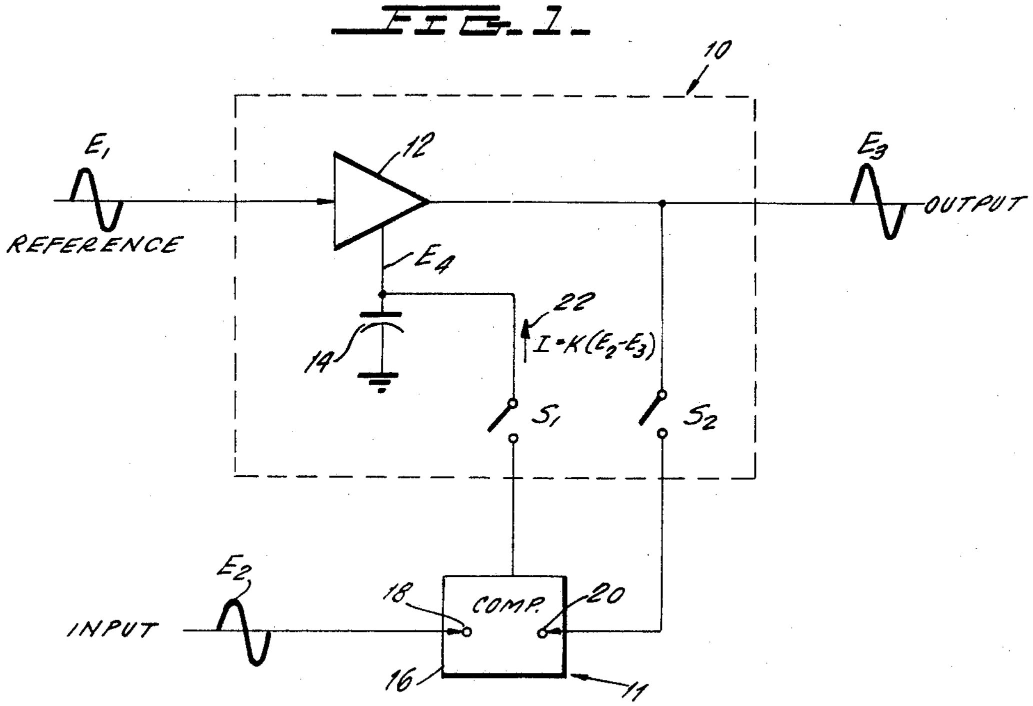
FIGURE 1 shows a schematic diagram of the universal memory cell of the instant invention.

Referring to FIGURE 1, there is shown the basic storage device of the instant invention in block diagram form. Since the storage of AC signals is of particular interest the description is presented in terms of an unknown AC sinusoidal quantity in order to highlight the advantages of the invention. It is noted that operation with DC signals or with any waveform, representing combinations of both AC and DC signals can be explained in the same manner.

The system is comprised of a memory channel 10, which stores the analog quantity, and a control unit 11, which samples and establishes the stored quantity in a manner to be presently described.

The memory channel 10 comprises a variable gain amplifier 12, a DC storage element 14 (shown for exemplary purposes only as a capacitor) (C), and switches $S_1$ and $S_2$. The control unit 11 comprises an analog comparator 16.

All of the component elements used in FIGURE 1 are presently within the state-of-the-art, are well known, and individually form no part of the instant invention. Various embodiments for each of the functions performed are possible. For instance, variable gain amplifiers have been constructed using multi-element tubes for AGC (automatic gain control) and broadcast compressors, and more recently using solid state devices such as transistors, diodes and the relatively new field effect transistors. The comparator 16 may be implemented as a conventional difference amplifier.

Broadly the operation of FIGURE 1 is based on automatically adjusting the gain of the variable gain amplifier 12 until its output, $E_3$, corresponding to a fractional portion of the reference signal $E_1$, equals the desired input quantity to be stored $E_2$. The final value of the gain is retained by virtue of the storage device 14, and upon subsequent activation, the amplifier 12 will produce an output signal $E_3$ which is equal to the input signal $E_2$.

Specifically, operation is as follows: When information is to be stored (or updated) switches $S_1$ and $S_2$ are closed thereby completing a feedback loop comprising amplifier 12, comparator 16 and storage device 14.

Amplifier 12 produces an output signal $E_3$ which is proportional to a predetermined reference signal $E_1$. The input signal to be stored $E_2$ is connected to the input 18 of the comparator 16, and the instantaneous output signal $E_3$ is connected via switch $S_2$ to input 20 of comparator 16.

The comparator develops an error current I which is proportional in amplitude and polarity to the difference between the input signal $E_2$ and the instantaneous output signal $E_3$. Such error current I is indicated at 22 as $I=K(E_2-E_3)$. Current 22 charges the storage device 14 (illustratively indicated as a capacitor 14) via switch $S_1$ to develop the voltage gain control signal $E_4$. Thus the gain of amplifier 12 is continually and automatically adjusted until the output signal $E_3$ equals the desired signal to be stored $E_2$. At that point the error current I is reduced to zero and the switches $S_1$ and $S_2$ are deenergized. The amplifier gain, and thus the output signal, are retained at the desired value by virtue of the DC storage element 14.

The gain control signal $E_4$ is a uni-directional DC voltage ranging from zero to a maximum as determined by the design. The gain of the amplifier 12 may be made proportional to this signal and thus vary from zero to a specified maximum. A bi-directional current I (reference numeral 22) is required to increase and decrease the gain.

The degradation of the quantity stored on the DC storage device 14 with time depends essentially on the discharge of the storage element, in the illustrative case a capacitor 14. Degradation time may be extended, through the use of conventional high impedance techniques and high quality low leakage capacitors.

It should be apparent that for single channel operation, switch $S_2$ is not required. It is included in FIGURE 1 to permit the basic system to be extended to multichannel operation.

In addition, switches $S_1$ and $S_2$ may be readily replaced by conventional transmission gates without affecting the principles of operation. This configuration is shown in block diagram form in FIGURE 2, wherein gates $G_1$ and $G_2$ replace switches $S_1$ and $S_2$, respectively. Control signal $E_5$ operates gates $G_1$ and $G_2$ in synchronism and in the sequence described for the switches $S_1$ and $S_2$ of FIGURE 1.

The interval over which the gates $G_1$, $G_2$ (switches $S_1$, $S_2$) are activated is not critical. To permit many channels to be sampled, the sampling time may be made a small fraction of the period of the input signal. It is noted that sampling intervals of less than ¼% of the input signal period have been found readily successful. The only restriction on the sampling interval is that it occur when the amplitude of the reference signal $E_1$ is sufficient to provide adequate loop gain. This may be made arbitrarily close to zero by including sufficient gain elsewhere in the loop, and is limited in practice only by noise signal.

Figure 2:
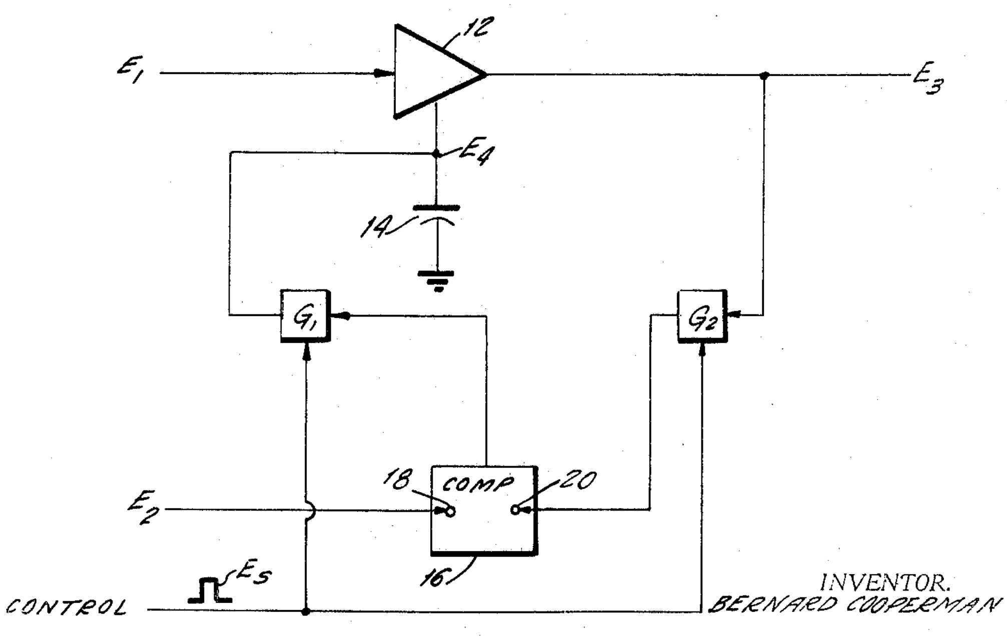
FIGURE 2 shows a schematic diagram of the memory cell of FIGURE 1 with schematically illustrated switches having been replaced by a gating circuit.

A unique advantage of the configuration of FIGURE 2 is that variations in the gain of the amplifier 12, the quality of the control gate $G_1$, and the value of the storage device 14 are not critical since they are effectively within a feedback loop during the settling operation; and therefore departures from design values are compensated for by the feedback action. The major critical element is the output transmission gate $G_2$, since errors in this gate are transmitted directly to the output. However, extremely accurate gates of this nature are well known in the art and furthermore, the position of $G_2$ in the circuit permits considerable freedom of design with regard to impedance and voltage levels thereby making improved gates practical.

The amplifier gain is not critical and it is only important that it remain constant during the holding interval. Thus slow variations relative to the holding periods are of little importance.

The general mathematical analysis of this system is highly complicated. However, considerable simplification is afforded by analyzing the system for DC inputs. Analysis during the settling phase is as follows:

For the comparator 16

(1) $$I=K_2(E_2-E_3)$$

where:

$K_2$ equals the comparator transfer constant amps./volt.
$E_2$ equals the input signal to be stored
$E_3$ equals the instantaneous output signal (2)
$$E_4=\frac{1}{c}\int I dt$$

where: $c$ is the capacitance of storage device 14

(3)
$$E_3=E_1\cdot K_1\cdot E_4$$

where:

$K_1$ equals the amplifier gain constant $(\text{volts})^{-1}$
$E_4$ equals the instantaneous gain control signal.

Combining Equations 1, 2 and 3 above, (4)
$$E_3=\frac{E_1\cdot K_1\cdot K_2}{c}\int (E_2-E_3)dt$$

Differentiating with respect to time, (5)
$$\frac{dE_3}{dt}+\frac{E_1\cdot K_1\cdot K_2\cdot E_3}{c}=\frac{E_1\cdot K_1\cdot K_2\cdot E_2}{c}$$

Using the La Place transformation and considering that:

(a) $E_1$ is a constant,
(b) $E_2$ is a DC voltage switched on at $t=_0$, and
(c) The initial voltage on the capacitor $E_4$ is equal to zero, one obtains the following equation:

(6)
$$sE_3(s)+\frac{E_1\cdot K_1\cdot K_2\cdot E_3(s)}{c}=\frac{E_1\cdot K_1\cdot K_2}{c}\cdot\frac{E_2}{s}$$

Solving (7)
$$E_3(s)=\frac{\frac{E_1\cdot K_1\cdot K_2\cdot E_2}{c}}{\left[s+\frac{E_1\cdot K_1\cdot K_2}{c}\right]}$$

and transforming to a function of $(t)$ (8)
$$E_3(t)=E_2\left[1-e^{\frac{-E_1\cdot K_1\cdot K_2\cdot t}{c}}\right]$$

Equation 8 illustrates that the output voltage $E_3$ settles to the desired value $E_2$ in an exponential manner. By suitably selecting the parameters, the stabilization time may be made as short as desired. It is noted that the reference signal $E_1$ is interpreted as a gain factor in the mathematical analysis and may effectively be used to reduce the total settling time. From Equations 7 and 8 it is readily apparent that the system described behaves like a velocity servo and therefore has no steady state error in response to a step function input.

Other modes of operation are possible wherein the voltage gain control signal $E_4$ is not strictly proportional to the error signal $(E_2-E_3)$. Such modifications include non-linear and proportional-plus control (wherein the current is proportional to the error only over a portion of the range) and can enhance the response time of the system.

Figure 3:
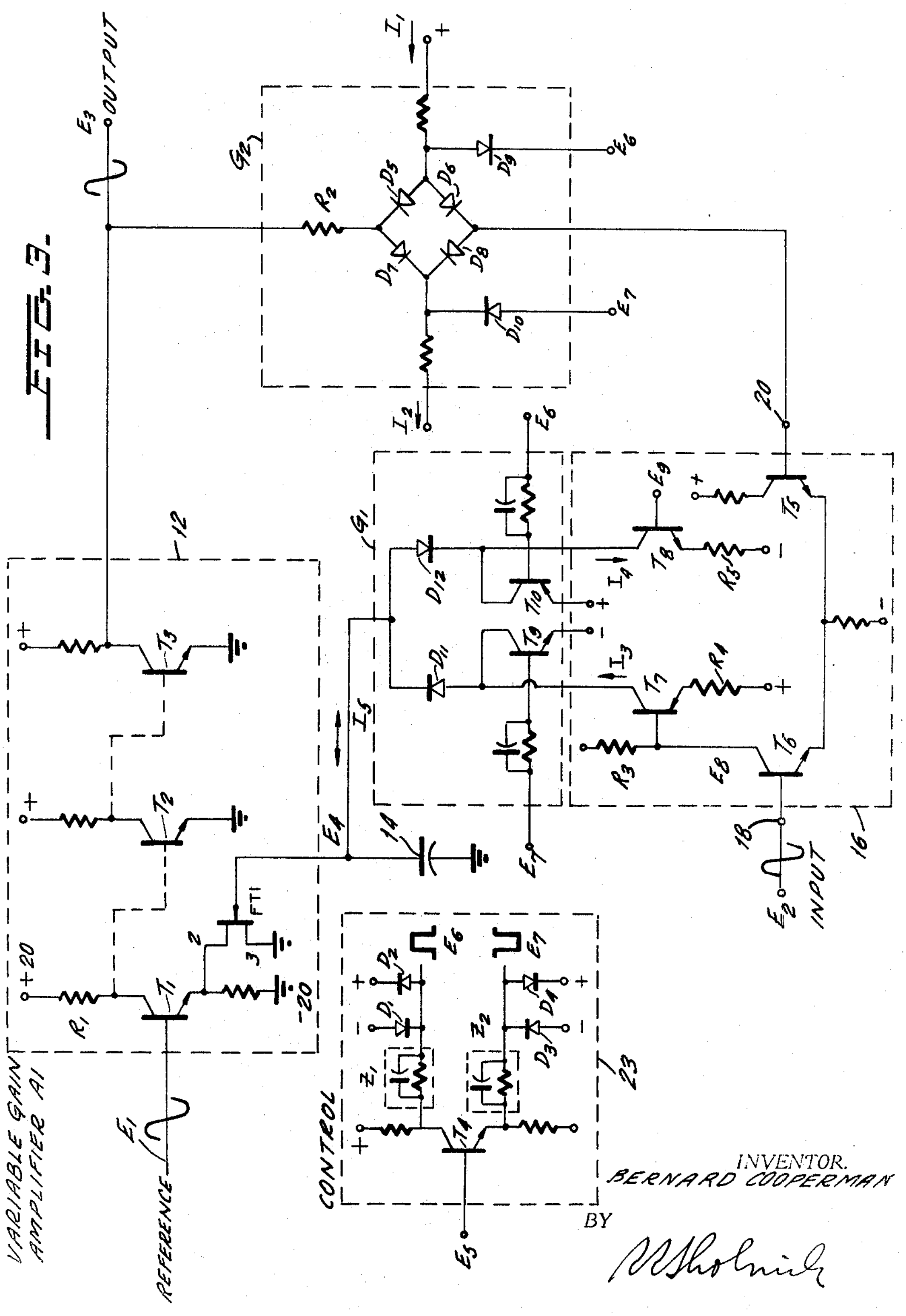
FIGURE 3 shows a schematic circuit diagram of the block diagram of FIGURE 2.

Referring to FIGURE 3, there is shown a simplified schematic diagram of an illustrative circuit to perform the functions associated with the block diagrams of FIGURES 1 and 2 as discussed above.

During a sampling interval, gate $G_2$ connects the output $E_3$ to the input 20 of the comparator 16 and gate $G_1$ connects the comparator output to the storage device 14. The control circuit 23 develops the appropriate gate control signals $E_6$ and $E_7$ in accordance with the control signal $E_5$ as follows:

Transistor $T_4$ in the control section 23 operates as a split load phase inverter developing two equal but phase inverted signals at its collector and emitter in response to the input signal $E_5$ on its base. Diodes $D_1$ through $D_4$ along with coupling networks $Z_1$ and $Z_2$ serve to clamp the gate control signals to the desired operating level.

During the sampling interval, $E_6$ is positive and $E_7$ negative. These signals are applied to the control inputs of gates $G_1$ and $G_2$.

Gate $G_2$ connects the output signal $E_3$ to input terminal 20 of comparator 16. During the inhibit mode (as contrasted to the sampling interval) control signal $E_6$ is negative and therefore applies reverse bias to diode pair $D_5$ and $D_6$ of gate $G_2$ via isolation diode $D_9$, and shunts current $I_1$ through diode $D_9$. Similarly, control signal $E_7$, negative during the sampling interval but positive during the inhibit mode, back biases diodes $D_7$ and $D_8$ via isolation diode $D_{10}$ and thereby shunts current $I_2$. Therefore, the output signal $E_3$ applied through resistor $R_2$ of gate $G_2$ is inhibited from passing to the comparator 16.

During the sampling interval control signals $E_6$ and $E_7$ apply reverse bias to diodes $D_9$ and $D_{10}$, respectively. At the same time diodes $D_5$–$D_8$ are forward biased by currents $I_1$ and $I_2$. These forward biased diodes present a low impedance path, and therefore the input signal passes through resistor $R_2$ and forward biased diodes $D_5$–$D_8$ to the output wherein it may be applied to the input 20 of the comparator 16.

The input signal $E_2$ is applied to terminal 18 of the comparator 16. This comparator consists of a conventional difference amplifier comprised of transistors $T_5$ and $T_6$ followed by current generators comprised of transistors $T_7$ and $T_8$. An error signal $E_8$, proportional to the difference $E_2$ minus $E_3$, is developed at the collector of transistor $T_6$ across load resistor $R_3$. This error signal $E_8$ is applied to the base of transistor $T_7$ and develops a current $I_3$, where $I_3=E_8/R_4$, proportional to the error signal $E_8$. Transistor $T_8$ develops a fixed current $I_4$, where $I_4=E_9/R_5$, oppositely directed to current $I_3$. During the inhibit mode, transistor switches $T_9$ and $T_{10}$ of gate 1 divert currents $I_3$ and $I_4$, respectively. Diodes $D_{11}$ and $D_{12}$ of gate 1 are reverse biased, thereby isolating the comparator 16 from the storage device 14.

During the sampling interval, transistors $T_9$ and $T_{10}$ are cut off (due to the control signals $E_7$ and $E_6$, respectively) and a net bipolar current $I_5$, where $I_5=I_3-I_4$, proportional to the error signal charges or discharges the storage device 14, thus completing the feedback loop. This action continues until the error decreases to an acceptable predetermined value as established by the design of the comparator.

As noted above, gates $G_1$ and $G_2$ when inhibited, isolate the variable gain amplifier 12 and the storage device 14 from the remaining portions of the system. The gain controlling voltage $E_4$ stored across storage device 14 is applied to bias the field effect transistor FT1 of the variable gain amplifier 12. The input impedance of FT1 is extremely high (impedances in excess of 2000 megohms are readily obtainable) and thus has negligible effect on $E_4$ during the storage interval. Bias voltage $E_4$ controls the resistance $R_{ds}$ between the source and drain terminals, 3 and 2, respectively, and thus controls the resistance in the emitter circuit of transistor $T_1$. Therefore, $T_1$ becomes a variable gain amplifier stage, the gain of which is given approximately by $R_1/R_{ds}$. Cascaded transistors $T_2$ and $T_3$ provide additional amplification and develop the desired output signal $E_3$. Thus the magnitude of the gain and consequently the dependent output voltage is established and maintained throughout the storage interval by the storage device 14.

It is to be understood that the above described circuit arrangement is merely illustrative of the many circuits which could be designed by one having ordinary skill in the art to perform the same or equivalent functions.

ANALOG STORAGE OF A PLURALITY OF INPUT SIGNALS

Figure 4:
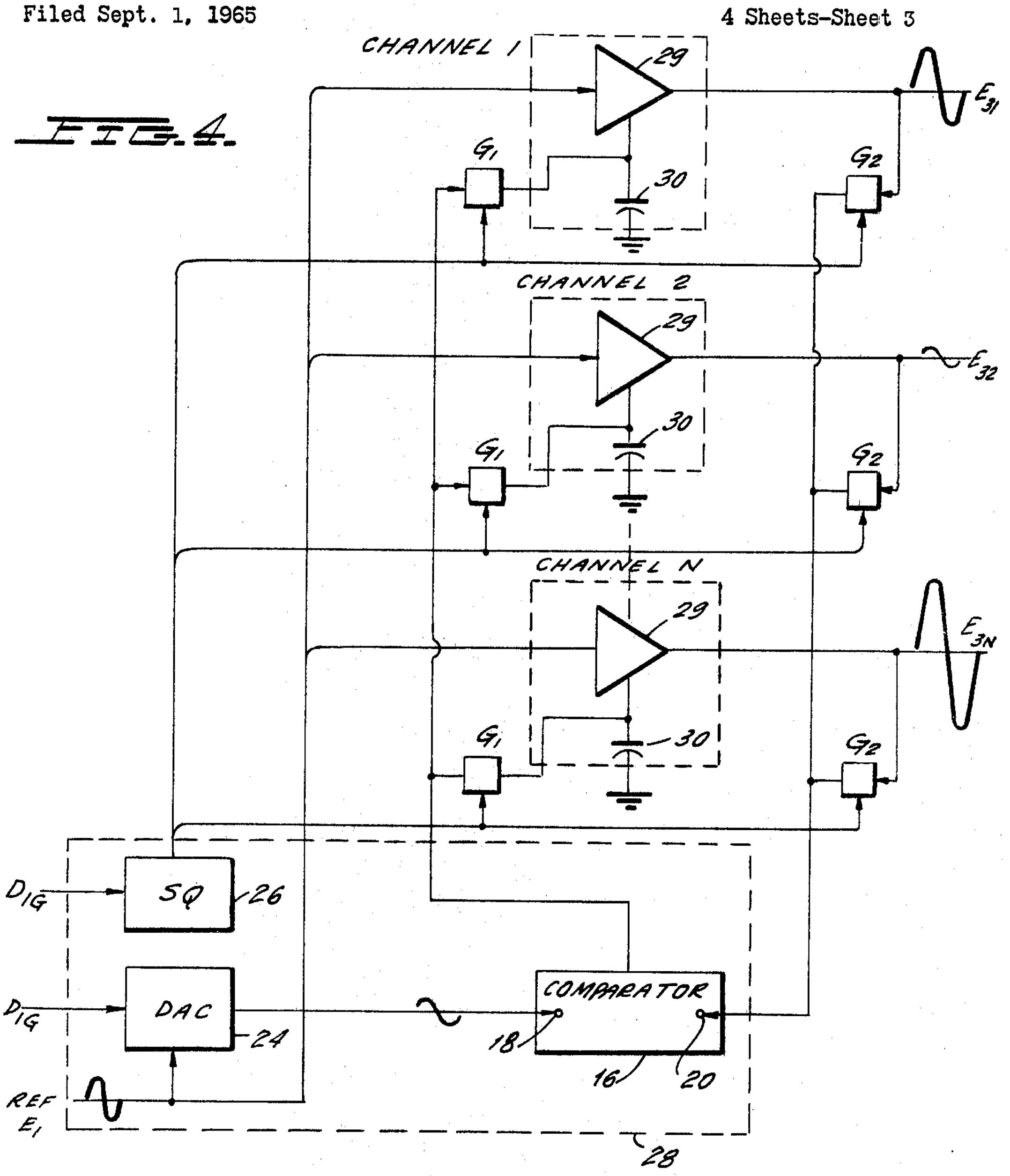
FIGURE 4 is a schematic diagram illustrating the extension of the basic memory cell to store a plurality of input signals.

FIGURE 4 illustrates the extension of the basic system of FIGURE 2 to a plurality of input signals. A specific application is shown wherein a single digital-to-analog converter 24 is used to provide $n$ sequential analog inputs.

The common equipment consisting of the comparator 16, the digital-to-analog converter 24, and the sequencing control unit 26 is shown within the dotted line and indicated as 28. As in the basic system, each memory channel consists of a variable gain amplifier 29, a storage element 30 (illustrated as a capacitor as in FIGURES 1 and 2) and transmission gates $G_1$ and $G_2$.

Operation of the multiple input channel storage device is as follows. Digital "words" are sequentially presented to the digital-to-analog converter 24. Each word has an associated address which is directed to the sequence control unit 26. The analog output of the digital-to-analog converter 24 is permanently connected to one input 18 of the comparator 16. The sequence control unit 26 develops a sampling pulse to $G_1$ and $G_2$ and channel 1 is thereby servoed to the analog output of the digital-to-analog converter 24. Such servoing or storage is accomplished in the manner described for FIGURE 1, whereby it can be seen that during an instantaneous sampling of the first analog signal, the circuit comprises a variable gain amplifier 29 having a predetermined reference input $E_1$ and a feedback circuit through gate $G_2$ to terminal 20 of comparator 16, the error signal of which is then applied to the storage element 30 (through gate $G_1$) and subsequently to the amplifier 29.

Subsequently, a second digital "word" and its address are presented to the converter 24 and sequence control unit 26, respectively. A new analog signal is developed at the output of the converter 24; gates $G_1$ and $G_2$ of channel 2 are activated; and channel 2 is servoed to adjust the output voltage $E_{32}$ to the desired value. It will be apparent that the circuit for the second channel comprises the variable gain amplifier 29, fed by the reference signal $E_1$ and a feedback circuit comprising $G_2$, comparator 16, gate $G_1$ and storage element 30.

This operation continues under external program control to selectively update each of the stored analog output signals.

Thus, on line digital-to-analog conversion is effectively attained through the use of only a single digital-to-analog converter and associated memory channels.

ANALOG COMPUTATION

Figure 5:
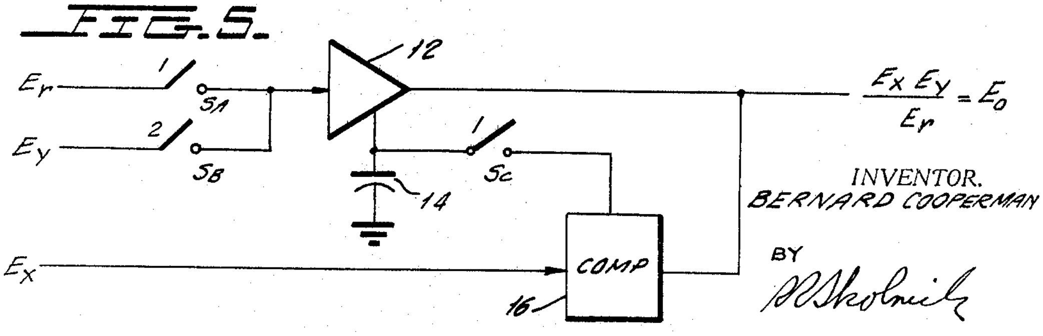
FIGURE 5 shows a schematic diagram illustrating use of the basic memory cell to perform multiplication and division function.

In FIGURE 5 is shown the single memory cell extended to perform basic analog computation such as multiplication and division. Amplifier 12, comparator 16, and storage device 14 are similar to those described with respect to the preceding figures. $E_r$ represents the reference signal (similar to $E_1$ of the preceding figures) and is of importance in computation only as a scale factor. Signals $E_x$ and $E_y$ represent the two input variables to be operated on. The numbers 1 and 2, associated with switches $S_a$, $S_b$ and $S_c$ indicate the order of operation, which is as follows:

Switches $S_a$ and $S_c$ are momentarily closed, thereby completing the feedback loop and servoing the output $E_o$ to $E_x$ in a manner exactly similar to the operation of the basic memory unit described above. At this point, is may be stated that the output voltage is $E_x$ and is equal to the gain of amplifier (K) times the input reference signal $E_r$.

$$E_x = K \cdot E_r$$

Solving this equation for K, one concludes that $$K = E_x / E_r$$

Subsequently, switches $S_a$ and $S_c$ are opened and $S_b$ closed. The gain $E_x/E_r$ is retained at the previously established value by virtue of the storage capability of the device 14. Thus the final output $E_o$ equals the gain times the new input $E_y$ which is $$E_o = (E_x/E_r)\, E_y$$

and is proportional to the desired product.

By reversing the order of operation of switches $S_a$ and $S_b$, the function of division may easily be obtained. To illustrate, let it be assumed that switches $S_b$ and $S_c$ are momentarily closed with switch $S_a$ remaining open.

Under these conditions the output serves to $E_x$. Thus the output equals $$E_x = K \cdot E_y$$

and therefore the gain equals $$K = E_x / E_y$$

Subsequently switch $S_b$ and switch $S_c$ are open and switch $S_a$ closed. The final output $E_o$ then equals the input (which is $E_r$) times the gain which from the previous equation is shown to be $E_x/E_y$. Thus the desired final output is proportionate to the desired ratio $E_x/E_y$.

Figure 6:
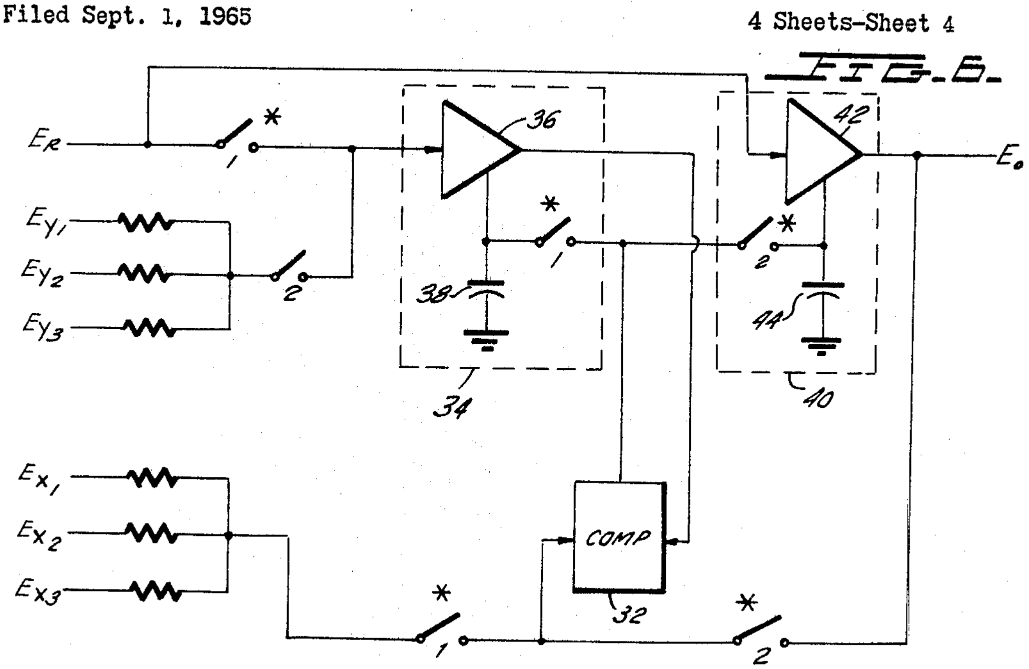
FIGURE 6 shows a schematic diagram illustrating use of the basic memory cell to perform the functions of multiplication and division of the sums of given input signals.

In FIGURE 6 is shown an extension of the circuit of FIGURE 5 in which by suitably summing inputs, it is possible to obtain a product or ratio of sums. In this figure a single comparator 32 services two memory channels, one memory channel 34 comprising amplifier 36 and storage device 38; the second memory channel 40 comprising amplifier 42 and storage device 44. The numbers below the switches indicate the operating time intervals while the presence of an asterisk at a switch location indicates a momentary operation. Memory channel 40 stores the previous product or ratio and is updated only after a new product or ratio is formed in memory channel 34 in a manner to be presently described. The use of two channels eliminates small transients which are present at the output of channel 34 during the interval over which the gain of amplifier 36 is established.

Switches labelled 1* are momentarily closed thereby forcing the output of amplifier 36 to $$\sum_{i=1}^{N} E_{x_i}$$

with the gain of amplifier 36 being servoed to $$\frac{1}{E_r} \sum_{i=1}^{N} E_{x_i}$$

The output of amplifier 42 does not change during this time.

Subsequently, switches labelled 1* open and switch 2 closes thereby forming the product $$\frac{1}{E_r} \sum_{q=1}^{M} E_{y_q} \cdot \sum_{i=1}^{N} E_{x_i}$$

at the output of amplifier 36. Following this, switches 2* are closed and the product or ratio stored in amplifier 36 is then servoed 42, the servo circuit comprising the output of amplifier 36 as one input to the comparator 32 with the ouput of amplifier 42 representing the second input to comparator 32. The difference between these two signals is then fed through switch 2* to storage device 44 and amplifier 42. Thus memory channel 40 retains the output which was previously derived in memory channel 34, and memory channel 34 is now open to compute a new product or ratio of the sums.

ANALOG-TO-DIGITAL CONVERSION

Figure 7:
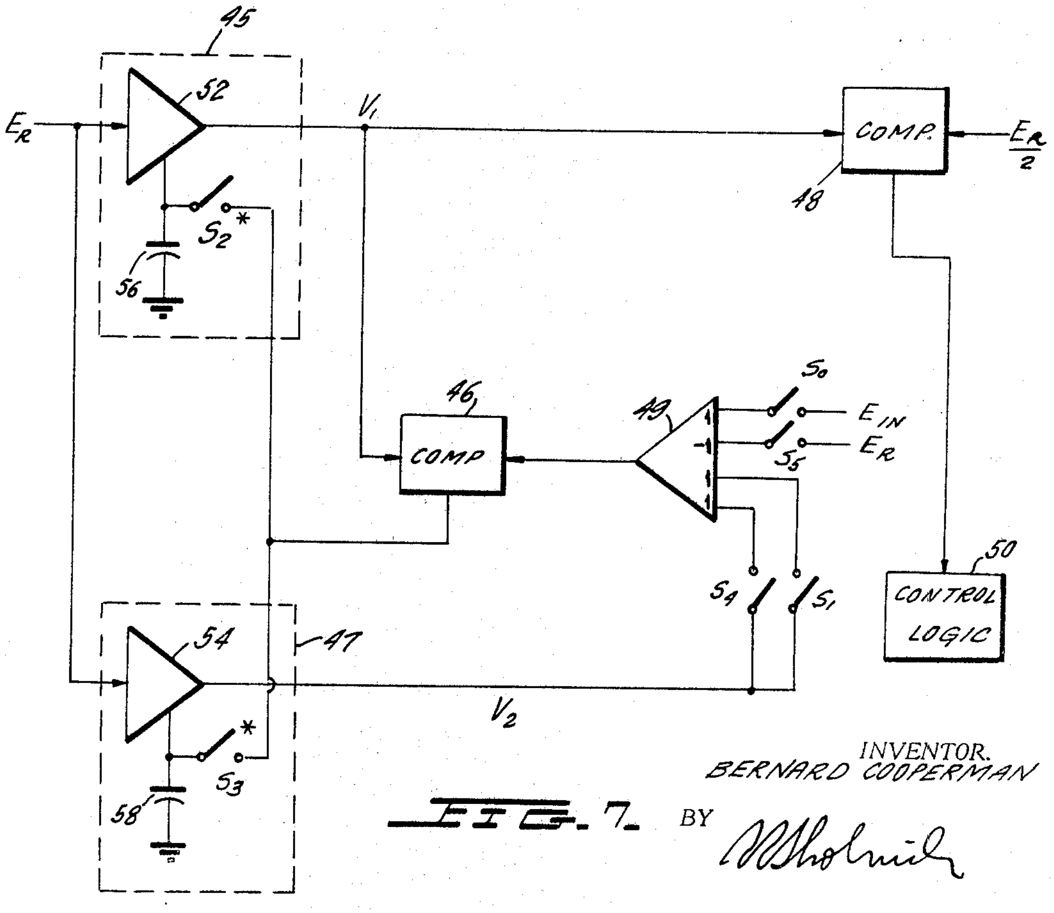
FIGURE 7 shows a schematic diagram illustrating use of the basic memory cell as a ratio type analog-to-digital converter.

In FIGURE 7 is shown the manner in which the basic memory cell may be expanded to function as a ratio type analog-to-digital converter. In this example, using the half split conversion method, the two memory cells 45 and 47 perform the combined function of the conventional precision network and bank of transmission gates (one required for each bit encoded), with the system being capable of converting AC quantities directly.

Conversion is performed by comparing successive trials against half the reference signal and depending upon the result of the comparison, recording a binary "zero" or "one" and developing a new trial. For example, a given input signal may be considered the first trial. If the input signal is less than half the given reference signal a binary "zero" is recorded, the input quantity is doubled and the process repeated. On the other hand, if the input signal is greater than half the reference signal, a binary "one" is recorded. In this case the next trial is formed by doubling the input signal and subtracting the reference signal. These operations are repeated until all the required digits are formed. The process may be expressed mathematically as follows:

$E_i|_{i=0}=E_o=E_{in}$ input to be encoded $E_r$= Reference input (corresponding to $E_{in_{max}}$)

If (9) $$E_i-\frac{E_r}{2}\leq 0$$

then $E_{i+1}=2E_i$ and record "o"

If

(10) $$E_i-\frac{E_r}{2}>0$$

then $E_{i+1}=2E_i-E_r$ and record "1."

The half-split conversion method described above is well known in the art and its theory represents no part of the instant invention. However, the implementation of Equations 9 and 10 by the universal analog storage device of the instant invention is a novel contribution to the art and may be understood by a detailed inspection of FIGURE 7.

The system comprises two memory cells 45 and 47, a common comparator 46 and switches $S_2$ and $S_3$. An operational amplifier is included to provide for the summing and scaling of initial and intermediate quantities. Comparator 48 determines if the trial is less or greater than the reference signal $E_r/2$ and, together with control logic 50 develops the binary coded output and determines the sequence of switching operations.

The variable gain amplifiers 52, 54; the comparator 46; switches $S_2$, $S_3$; storage devices 56 and 58; and their combined operation in the formation of a multi-channel memory cell has been previously described and will not be repeated.

The summing amplifier 49 is a conventional operational amplifier well known in the art and needs no further description. The control logic is comprised of gates and flip-flops interconnected in a well known manner to generate the successive control signals for this type of converter. Furthermore, it should be recognized that although switches are shown for the sake of simplicity, appropriate solid state gates may be used in all cases.

The sequence of operation of the analog-to-digital converter of FIGURE 7 is as follows. At the beginning of the conversion cycle all switches except $S_0$ are presumed normally open. The conversion is initiated by momentarily closing switch $S_2$* (as defined previously, an asterisk indicates momentary operation of the switch). The input signal $E_{in}$ is thereby stored in memory channel 45 and becomes the first trial to be compared with $E_r/2$ by comparator 48. The storage of $E_{in}$ in memory channel 45 is the same as the basic memory cell operation of FIGURE 1.

Switch $S_0$ is now open, and switch $S_1$ closed. Subsequently switch $S_3$* is closed and the output of memory channel 45 is thereby stored in memory channel 47 (note that the basic memory channel operation comprises a reference signal $E_r$ being applied to amplifier 54 with its output passing through switch $S_1$, amplifier 49, and to one input of the comparator 46. The second input to comparator 46 is the output signal of memory channel 45, with the difference between these two input signals being applied to the storage device 58 and amplifier 54 to servo the output of amplifier 54 until its output equals the output of memory channel 45).

The next step is to compare the trial value (the value presently stored in memory channel 45) with one-half of the reference signal. This comparison is accomplished by means of comparator 48. The two possible results of this comparison are:

(a) $$E_{in}<\frac{E_r}{2}$$

(b) $$E_{in}>\frac{E_r}{2}$$

Each case, (*a*) and (*b*), will be considered below:

(a) $$E_{in}<\frac{E_r}{2}$$

In this case a binary "zero" is recorded for the corresponding bit and switches $S_4$ and $S_2$* are closed. With switch $S_4$ closed and switch $S_1$ previously closed, summing amplifier 49 presents a signal equal to 2 times the output of memory channel 47 (which output is $E_{in}$) to the memory channel 45, and channel 45 then servoes in the manner previously described to twice the input signal. Thus a binary "zero" has been recorded for the first trial, and twice the input signal may be compared to $E_r/2$ and the process repeated.

(b) $$E_{in}>\frac{E_r}{2}$$

In this case a binary "one" is recorded, and switches $S_4$, $S_5$ and $S_2$* are closed. There being a gain of minus one for the switch $S_5$ input to the amplifier, the total output of amplifier 49 is

(11) $$2E_{in}-E_r$$

(note $S_4$ and $S_1$ are both closed giving an input to amplifier 48 of $2E_{in}$ with $E_r$ being subtracted therefrom by means of the minus one gain for the $E_r$ input). Thus a binary "one" has been recorded for this trial and the new trial signal, as determined by Equation 11 above, will be servoed in memory channel 45 to be compared with $E_r/2$.

After either of the preceding steps is completed (corresponding to possibilities (*a*) or (*b*) above), switch $S_4$ (and switch $S_5$ in the second possibility, (*b*),) is opened and switch $S_3$* is momentarily closed. This final step stores the last computed value which is in channel 45 into channel 47 thus completing the encoding of a single bit.

The cycle is repeated again comparing the value stored in channel 45 with $E_r/2$ and on the basis of comparison proceeding along the path defined above, i.e., possibility (*a*) or possibility (*b*), the desired number of bits are encoded.

There has thus been described a universal analog storage device which servoes its output to a given analog input signal. Such a device is capable of storing a given input analog signal and subsequently reproducing that signal when desired. Furthermore, it has been shown that the universal analog storage device is modular in nature and may be easily extended to perform many of the functions desirable in computing systems such as multi-channel storage, multiplication and division, multiplication and division of sums, and analog-to-digital conversion. Obviously the modular universal storage device may find use in any application where it is desirable to store analog signals.

Although I have described my invention with a certain degree of particularity it is understood that the present disclosure has been made only by way of example and that numerous changes in the detail of construction and the combination arrangement of parts may be resorted to without departing from the sphere and scope of the invention as hereinafter claimed.

What is claimed is:

1. An electrical circuit including signal storage means for performing a prescribed function comprising:

first means for producing a variable output signal proportional to a given reference signal;

second means responsive to a recurring input signal and to said output signal for impressing a control voltage on said first means, said control voltage varying the output signal of said first means until said output signal equals said input signal; and third means responsive to said control voltage for storing the value of said control voltage;

whereby, upon subsequent occurrence of said input signal, a function of providing an output signal equal in magnitude to said input signal is performed by said circuit.

2. The circuit of claim 1, wherein said second means provides a control voltage representative of the difference between said input signal and said output signal.

3. The circuit of claim 1, wherein said third means is a capacitor responsive to said control voltage and electrically connected to said first means.

4. An electrical circuit including signal storage means performing a prescribed function comprising:

a variable gain amplifier for producing an output signal proportional to a given reference signal;

a comparator responsive to said output signal and to a recurring input signal for impressing a control voltage on said amplifier, said control voltage being indicative of a difference between said input and output signals; and means connected in electrical parallel between said comparator and said amplifier for storing the value of said control voltage;

whereby the control voltage from said comparator performs the function of varying the output signal of said amplifier until said output signal equals said input signal in magnitude upon subsequent reoccurrence of said input signal.

5. An electrical circuit including signal storage means for performing a prescribed function comprising:

first means for producing a variable output signal which is proportional to a given reference signal; and feedback means connected to said first means, said feedback means including comparator means responsive to said output signal and to a recurring input signal for impressing a control voltage upon said first means representative of the difference between said output signal and said input signal, said feedback means further including storage means connected between said comparator means and said first means for storing the value of said control voltage;

whereby, upon subsequent reoccurrence of said input signal, a function of providing an output signal equal in magnitude to said input signal is performed by said circuit.

6. An electrical circuit including signal storage means for performing a prescribed function comprising:

a plurality of amplifying means each producing a variable output signal proportional to a given reference signal;

first means selectively responsive to one of said output signals and to one of a plurality of applied input signals for impressing a control voltage on the one of said amplifying means producing said one output signal, said control voltage performing the function of varying the magnitude of said one output signal until it equals the magnitude of said one input signal; and second means associated with each of said amplifying means for storing the value of the control voltage impressed thereon.

7. A circuit according to claim 6 wherein each of said amplifying means is a variable gain amplifier, and wherein said first means is a comparator, with the control voltage produced by said comparator providing and indication of the difference between said output signals and said input signals.

References Cited

UNITED STATES PATENTS

| | | | |
|---|---|---|---|
| 3,158,759 | 11/1964 | Jasper | 328—151 XR |
| 3,368,153 | 2/1968 | Garde | 328—147 XR |

JOHN S. HEYMAN, Primary Examiner

JOHN ZAZWORSKY, Assistant Examiner

U.S. Cl. X.R.

307—229, 235, 238; 330—29; 340—173